Sept. 6, 1927.

F. A. NIEBERDING 1,641,350

BURNER

Filed Nov. 3, 1923

2 Sheets-Sheet 1

Inventor
Frank A. Nieberding
By Hull, Brock & West
Attys.

Sept. 6, 1927.
F. A. NIEBERDING
BURNER
Filed Nov. 3, 1923
1,641,350
2 Sheets-Sheet 2
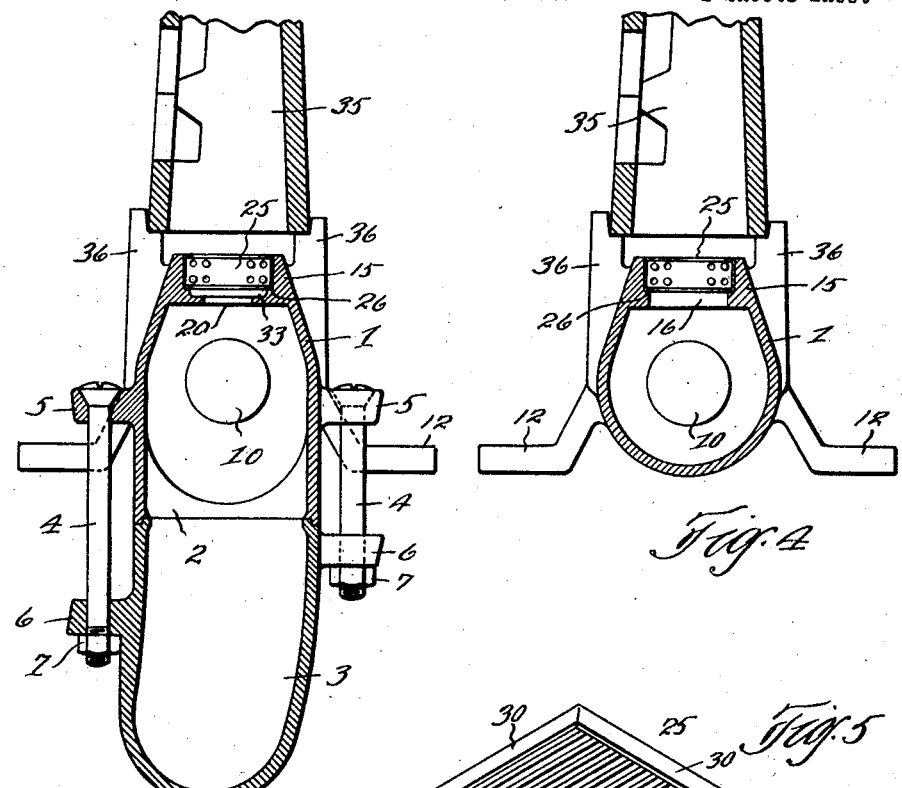
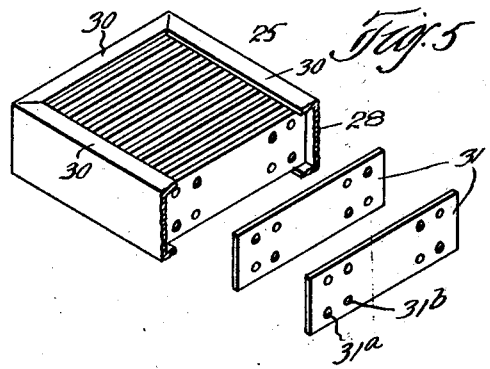
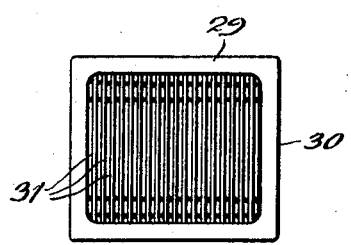
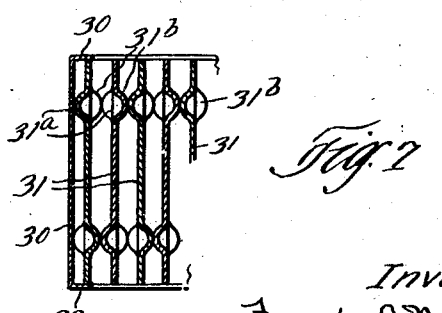
Inventor
Frank A. Nieberding
By Hull, Brock & West
Attys.

Patented Sept. 6, 1927.

1,641,350

UNITED STATES PATENT OFFICE.

FRANK A. NIEBERDING, OF CLEVELAND, OHIO; MARGARET H. NIEBERDING ADMINISTRATRIX OF SAID FRANK A. NIEBERDING, DECEASED.

BURNER.

Application filed November 3, 1923. Serial No. 672,481.

This invention relates to an improved gas burner. The embodiment herein disclosed is designed for use in that type of heaters wherein elongated artificial fuel elements—called radiants—are employed, the radiants being arranged in a row, one over each of the burner openings. To obtain the maximum of efficiency and produce a satisfactory appearance, the gas should be distributed substantially uniformly to all the burner openings. Also, a free and unobstructed flow of gas through said openings and entirely within the radiants should be effected and with the least possible liability of back-firing into the burner body or mixing tube.

The objects of my invention are the economical production of a simply constructed burner through which the foregoing desirable results are obtained and which is practically indestructible from any cause arising within the scope of its intended use.

A further object is the production of a highly efficient and durable burner tip that is designed to prevent back-firing and that is particularly simple and convenient of manufacture and is therefore cheap.

Figure 1:
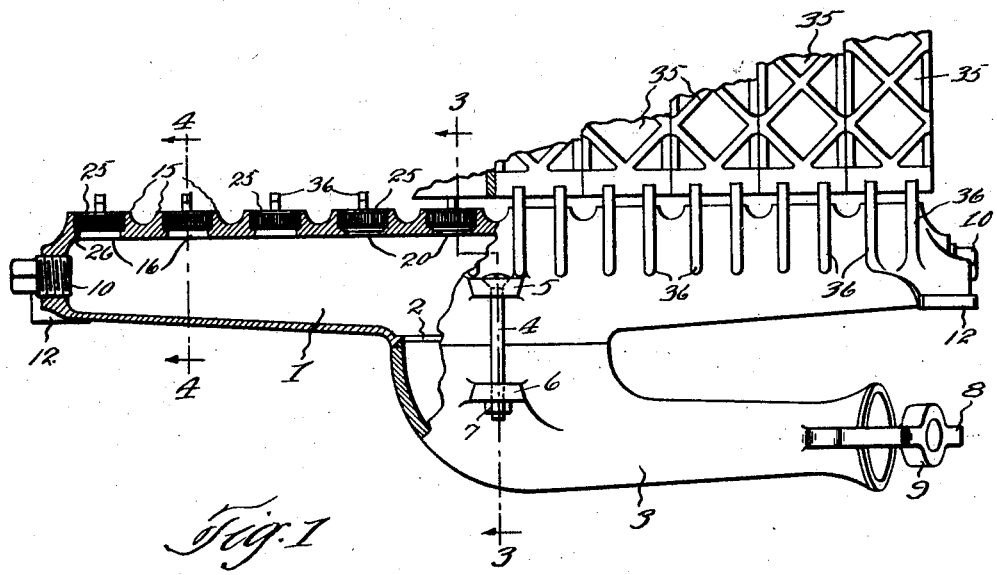
Figure 2:
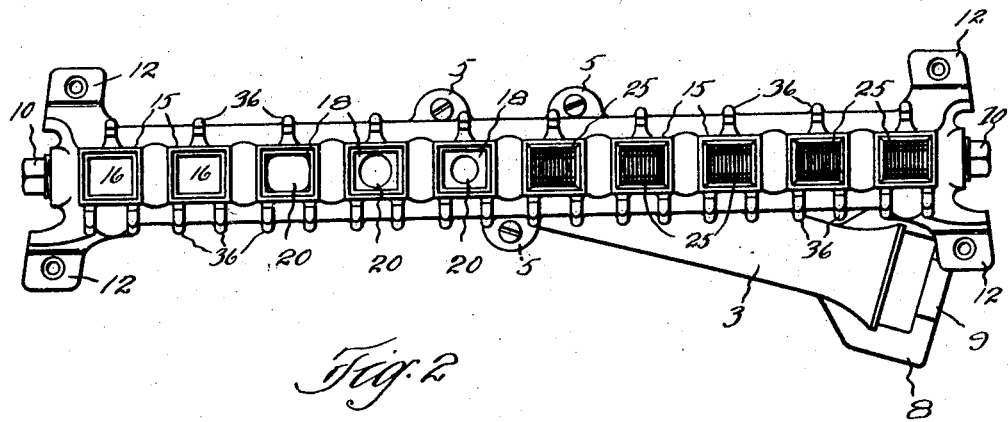

In the accompanying drawings, Fig. 1 is a front elevation, partly in section, of my improved burner, fragments of radiants being associated with the right hand end of the burner; Fig. 2 is a plan view of the burner with the tips omitted from the gas emitting openings throughout the left hand half of the burner; Figs. 3 and 4 are transverse sections on the respective lines 3—3 and 4—4 of Fig. 1, the present views being on a considerably enlarged scale over that of the former views; Fig. 5 is a fragmentary perspective view of one of the burner tips; Fig. 6 is a bottom plan view thereof; and Fig. 7 is a partial section through the tip, these detail views being greatly enlarged over actual size, especially with respect to Fig. 7, the enlargement being necessary to properly disclose the structural features of the tip.

The burner consists of an elongated hollow body 1 having an opening 2 at the middle of its lower side the edge surrounding said opening being rabbeted to interfit with the mating end of a mixing tube 3 that is clamped to the body 1 by bolts 4 which are engaged through ears 5 and 6 of the burner body and mixing tube, respectively, and which have nuts 7 applied to their lower ends. According to the present design the mixing tube extends toward the right hand end of the burner and is inclined forwardly with respect thereto as best shown in Fig. 2. A yoke 8 is disposed across the outer end of the mixing tube and has a boss 9 for the attachment of a suitable valve.

The body 1 is preferably cast, and core openings which occur in the ends of the body are shown as closed by plugs 10. At its opposite ends, the body is provided with supporting ears 12 by means of which it may be attached to a heater frame or stove structure.

Equally spaced along the top of the burner body are hollow bosses 15 which surround gas emitting passageways which may be referred to as burner orifices or openings 16, the bosses being shown as rectangular in plan. Across those of the burner openings occurring in the region of the longitudinal center of the body—that is, directly above the gas inlet openings 2—are thin webs 18 within which holes 20 are reamed or otherwise made to a proper size to effect a uniform distribution of gas to all of the burner openings. As will be seen from an inspection of Fig. 2, the holes 20 which occur immediately above the opening 2 are smaller than those next toward the ends of the burner, the holes becoming gradually larger toward said ends, the size increasing more rapidly toward the right hand end of the burner than toward the left. As shown, the two holes 20 which are nearest the center of the burner are the same size. The next toward the left is some larger, while the next toward the right is considerably greater in diameter than the last mentioned one. The next hole 20 to the left is of almost the same area as the normal burner opening, while the corresponding burner opening toward the right hand end of the body is wholly unrestricted, as are the two last openings at each end of the burner. Thus it will be seen that the burner openings are graduated from the center toward the ends of the body. The purpose of this peculiar graduation of the opening is obvious upon considering the flow of gas through the mixing tube into the hollow body 1. Naturally the gas will impinge against the top wall of the body 1 in the region of the opening 2 with considerably greater force than it will toward the ends of the burner; and due to the inertia of the gas the decrease in pressure will be less abrupt toward the left hand end than toward the right, the gas being directed toward the left hand end by the mixing tube. Consequently, the orifices or openings enlarge more gradually toward the left hand end of the burner than toward the right, and as a consequence, a uniform distribution of the gas from end to end of the burner is effected.

A burner tip, designated generally by the numeral 25, occupies each of the bosses 15 and rests upon a shoulder 26 in the lower end of the boss. This shoulder, in fact, defines the burner orifice or opening. To more effectively secure the tips in place and to prevent as far as practicable the leakage of gas between the tip and the boss, a quantity of suitable cement is placed upon the shoulder 26 before the tip is inserted within the boss and this cement distributes itself about the tip and closes the joint. Each tip is made up of a frame 28 of sheet metal that is preferably drawn to a box-like shape having an inwardly directed flange 29 at its lower end, and flanges 30 at its upper end which, prior to the insertion of plates 31 within the frame, are left in upright position. The plates 31 are arranged side by side within the frame and are spaced from each other by bosses 31$^a$ and 31$^b$, the bosses 31$^a$ projecting from one side of the plates while the bosses 31$^b$ project from the other side thereof. The bosses may be conveniently formed by displacing the metal. While all the plates 31 are identical, the bosses are so arranged that by reversing every other plate they are spaced from the end walls of the frame and from each other, as indicated most clearly in Fig. 7. After the plates are inserted into the frame against the bottom flange 29, the top flanges 30 are turned over to confine them. This method of constructing the tips insures cheapness and uniformity of product.

In the actual device, the plates 31 are quite thin, are relatively wide, and are arranged close together so as to cut up the area of the burner openings into numerous narrow and deep passageways, the purpose being to prevent the fire from flashing back into the burner or mixing tube while offering no appreciable resistance to the flow of the gas. Furthermore, it breaks up the column of gas and improves combustion, and distributes it better within each radiant.

While, as previously explained, the tips are cemented within the bosses 15, and the joints between the tips and bosses thus closed, should gas leak through the joint it would be of no consequence as this gas would immediately join the body of gas issuing through the tip and burn therewith.

While it is essential, as hereinbefore explained, to control the flow of gas to the individual tips by providing the graduated holes, it is just as important that the gas be distributed thoroughly over the under side of each of the tips, and for this reason the webs 18 are spaced far enough below the shoulders 26 to provide chambers 33 within which the gas may spread out and have access to the entire area of the under side of the tip.

Radiants 35 may be supported above and in operative relation to the burner openings as by fingers 36 that are shown as cast integral with the body 1.

Having thus described my invention, what I claim is:—

1. A gas burner comprising a hollow body having a gas admitting opening and a plurality of gas emitting passageways, the outlet ends of the passageways being of substantially uniform size while the inlet ends of the respective passageways, as the passageways progress away from the region of the gas admitting opening, become gradually larger.

2. A gas burner comprising an elongated hollow body having a gas admitting opening and a plurality of gas emitting orifices, said orifices being all of substantially the same size, and webs disposed across certain of said orifices and having holes therein, the holes of the webs gradually becoming larger as they progress away from the region of the gas admitting opening.

3. A burner of the character set forth comprising a hollow body having a gas admitting opening and a plurality of gas emitting orifices, all orifices being of substantially the same size, webs disposed across the inner side of those of the orifices which are in the general vicinity of the gas admitting opening, the webs having holes which increase in size as they progress away from the immediate region of the gas admitting opening thereby to effect a substantially uniform distribution of the gas to all the orifices.

4. A burner of the character set forth comprising an elongated hollow body having a gas admitting opening and a series of gas emitting orifices extending throughout its length, all of said orifices being of substantially the same size, burner tips associated with the orifices, the burner incorporating webs which extend across the inner side of those of the orifices in the general vicinity of the gas admitting opening and which are spaced from the tips associated with said orifices, said webs having holes which increase in size progressively away from the immediate vicinity of the gas admitting opening.

5. A burner of the character set forth comprising an elongated hollow body having a gas admitting opening and a series of gas emitting orifices extending throughout the length of the body, bosses surrounding said orifices and having internal seats spaced from their upper ends, tips occupying the bosses and resting upon said seats, the burner body incorporating webs extending across the inner ends of those of the orifices in the region of the gas admitting opening and which webs are spaced a distance below the aforesaid seats, the webs having holes which enlarge progressively away from the immediate vicinity of the gas admitting opening.

6. A burner of the character set forth comprising a one piece elongated hollow body having a gas admitting opening and a series of gas emitting orifices extending throughout its length, a mixing tube joining the gas admitting opening of the body and directing the gas toward one end thereof, the gas tending to accumulate more within the latter end of the body than within the other, the body incorporating webs extending across the inner ends of the orifices, said webs having each a hole, the holes of the various webs increasing in size progressively away from the immediate vicinity of the gas admitting opening, those toward the end of the body wherein the gas tends to accumulate to a greater extent enlarging more slowly than those toward the other end of the body.

In testimony whereof, I hereunto affix my signature.

FRANK A. NIEBERDING.